Aug. 8, 1933. L. J. PIERCE 1,921,479
APPARATUS FOR WASHING SHEET GLASS
Filed Oct. 9, 1931 7 Sheets-Sheet 1
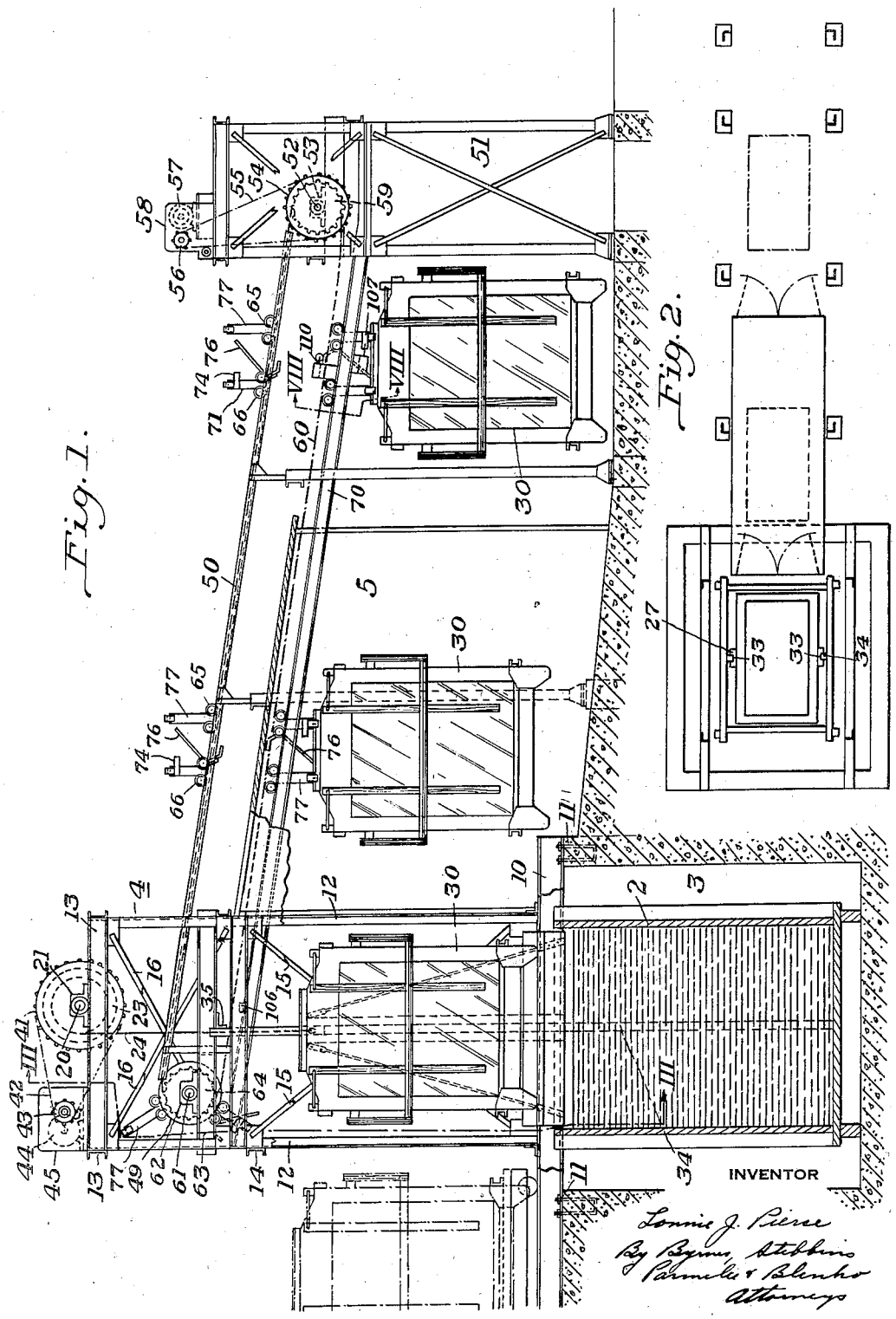

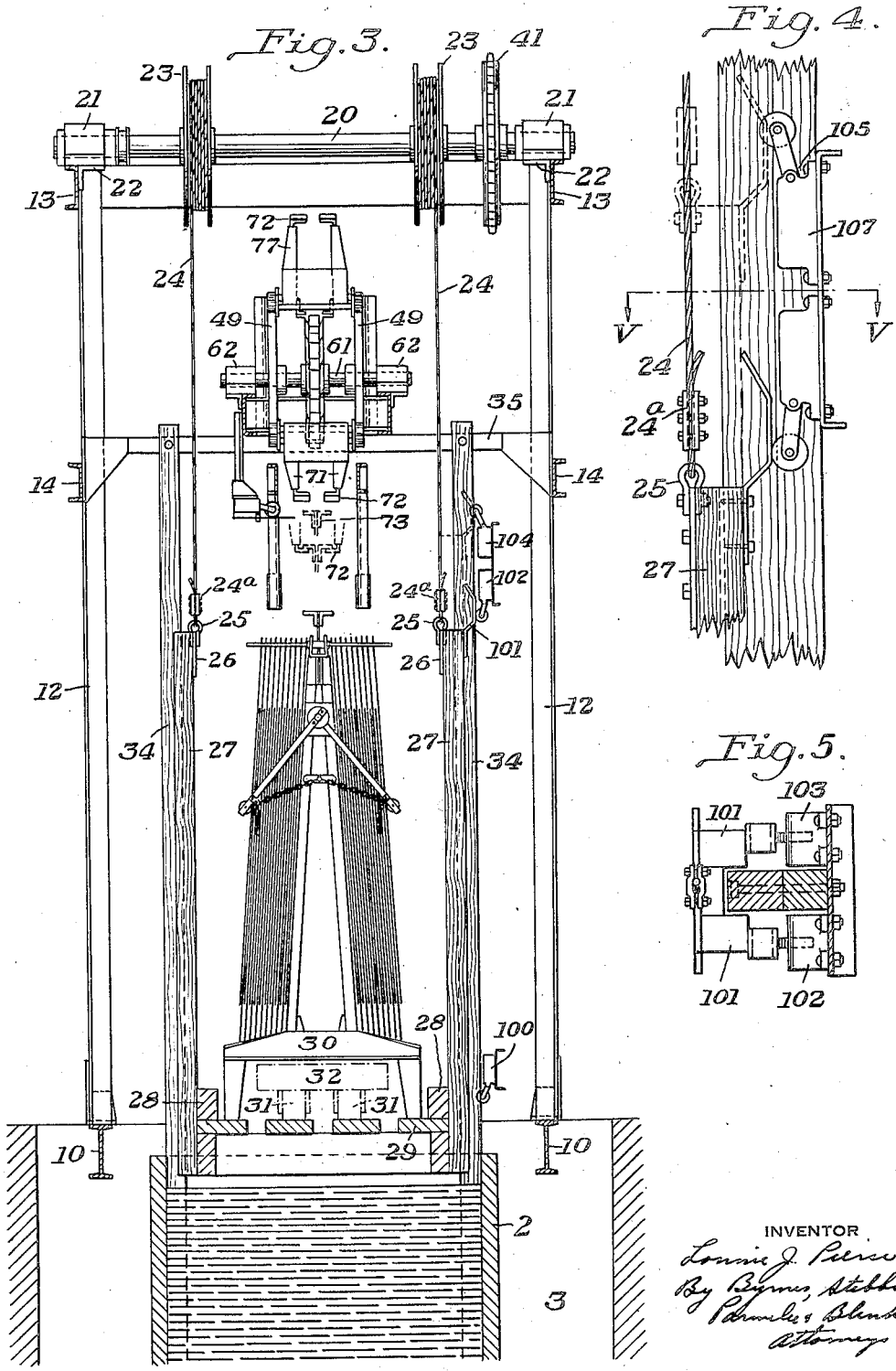

Aug. 8, 1933.  L. J. PIERCE  1,921,479
APPARATUS FOR WASHING SHEET GLASS
Filed Oct. 9, 1931 7 Sheets-Sheet 3
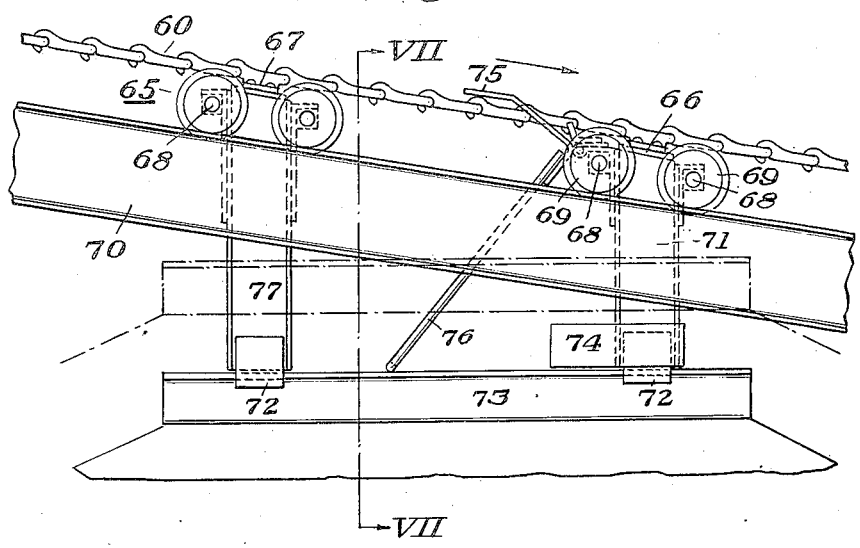
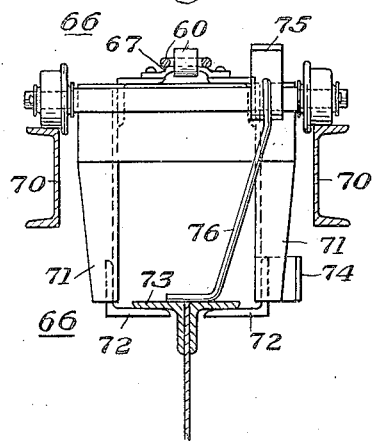
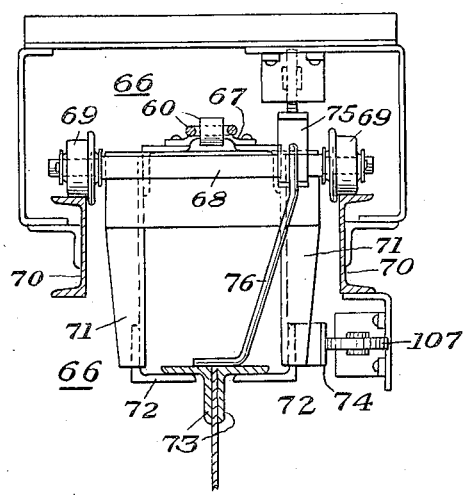
INVENTOR
Lonnie J. Pierce
By Byrnes, Stebbins
Parmelee & Blenko
Attorneys

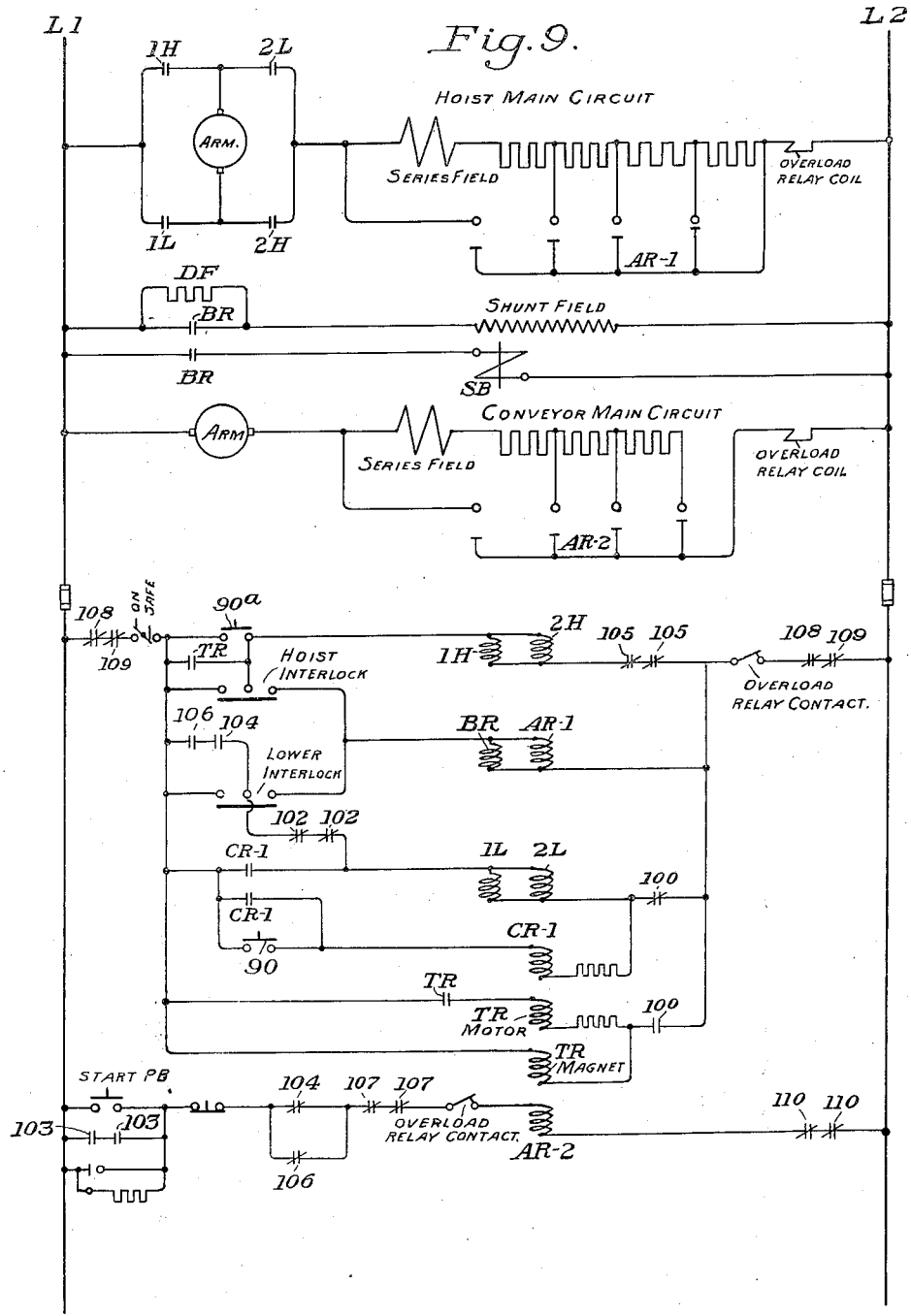

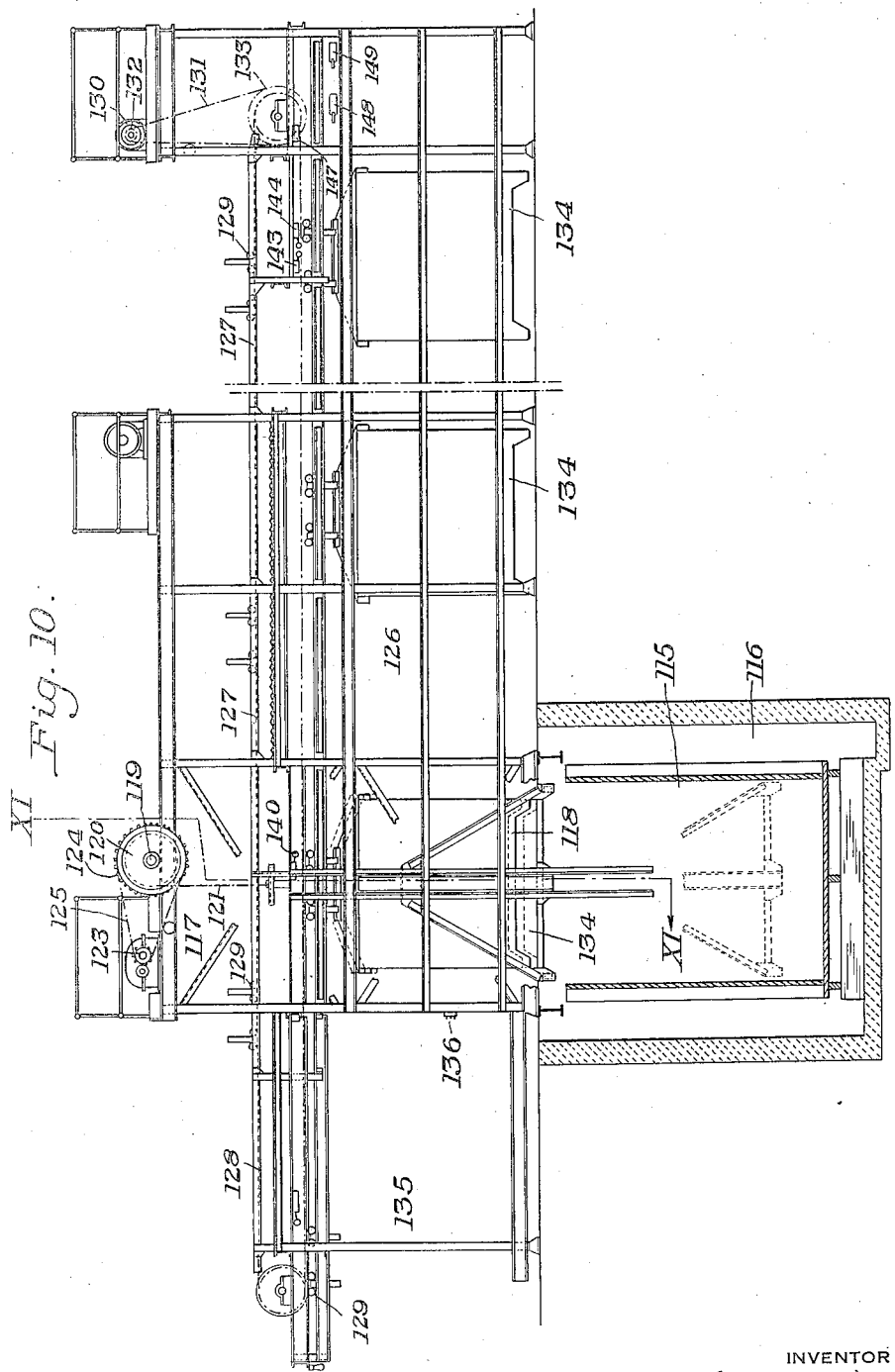

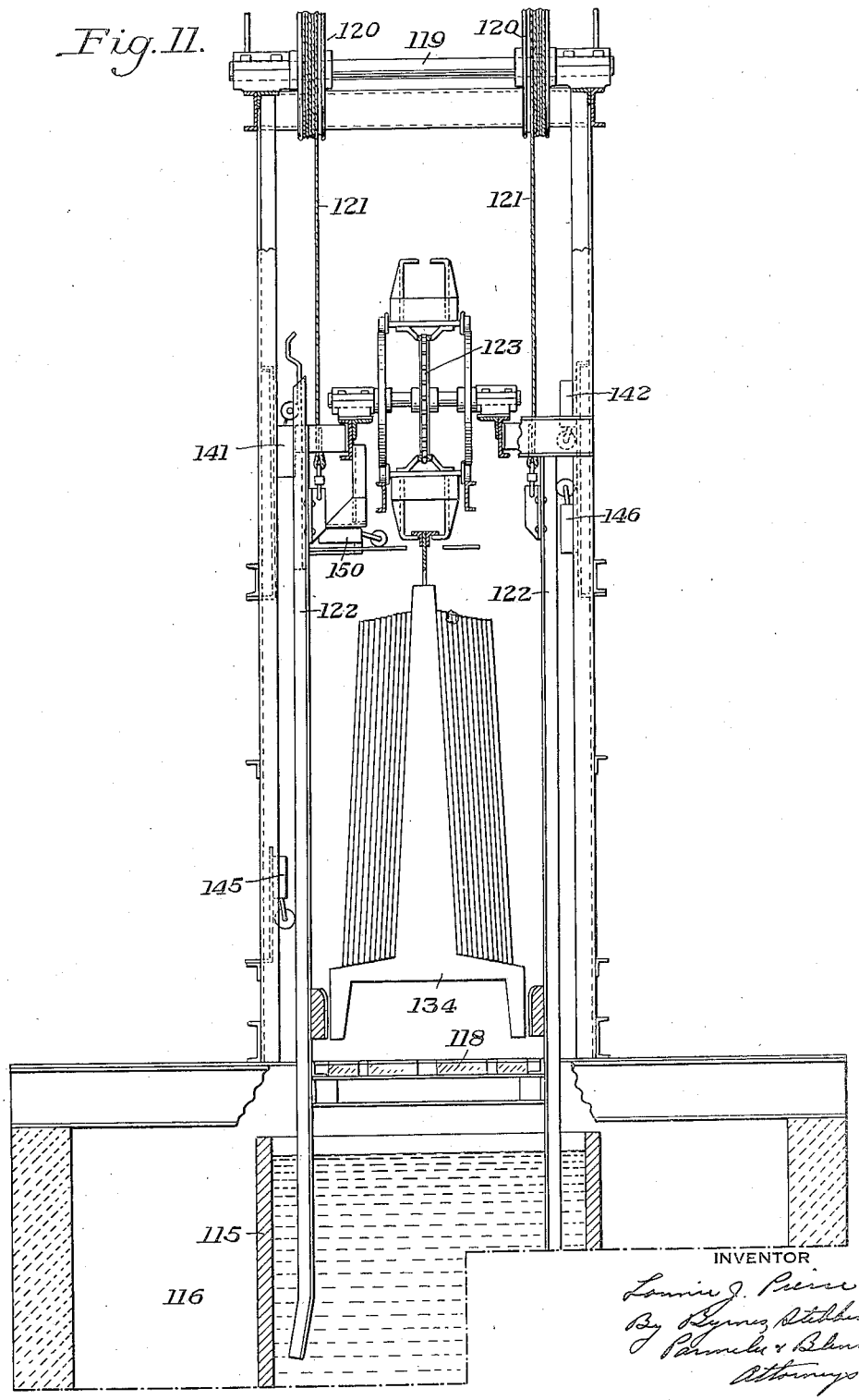

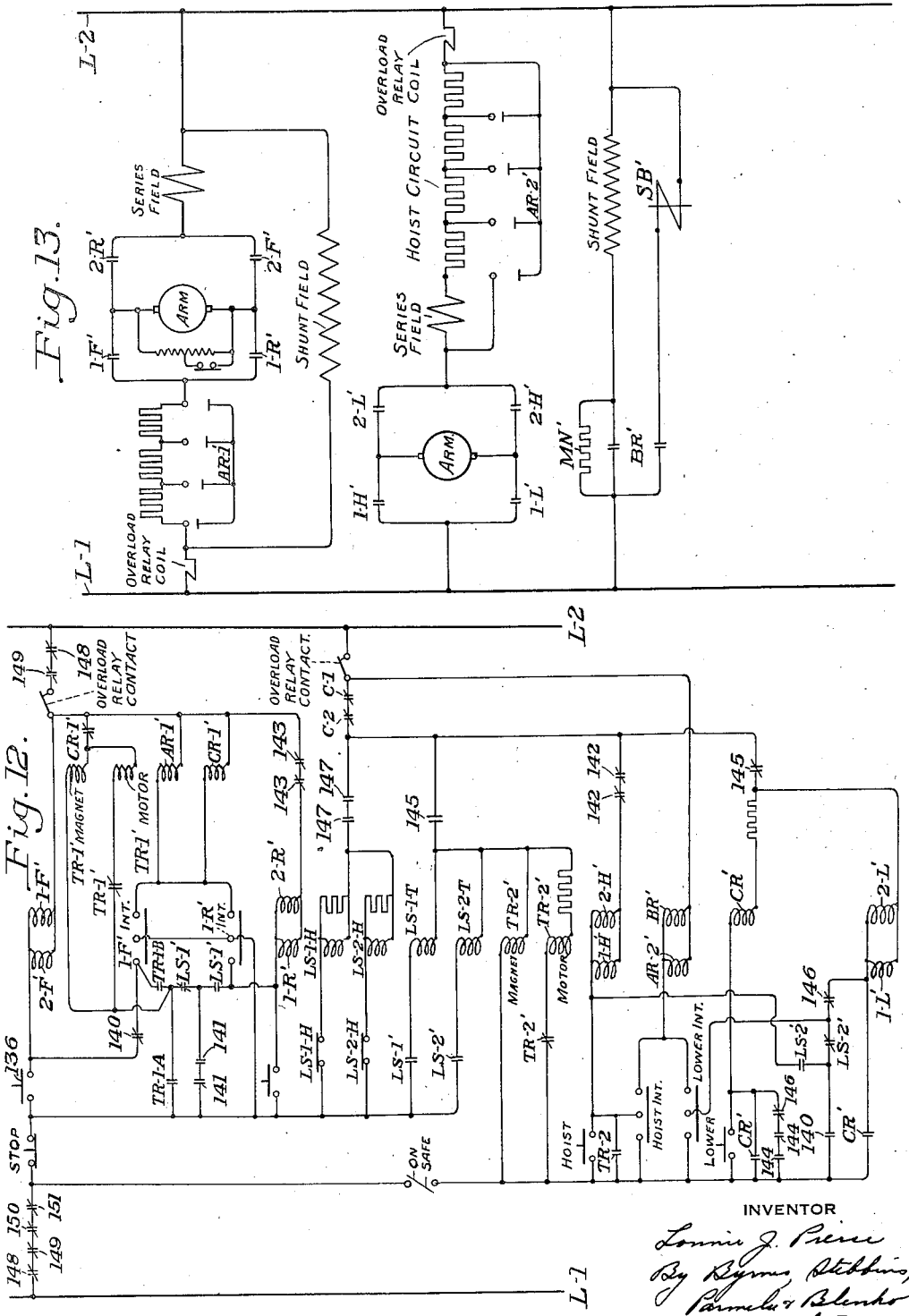

Patented Aug. 8, 1933

1,921,479

UNITED STATES PATENT OFFICE 1,921,479

APPARATUS FOR WASHING SHEET GLASS

Lonnie J. Pierce, Pittsburgh, Pa., assignor to American Window Glass Company, Pittsburgh, Pa., a Corporation of Pennsylvania Application October 9, 1931. Serial No. 567,821

12 Claims. (Cl. 214—89)

My invention relates generally to the washing of sheet glass, and more specifically to the provision of apparatus whereby the sheets of glass may be automatically passed through the washing and drying operations and transported to a point of delivery without any manual handling of the glass sheets themselves or of the racks by which they are supported during their passage through these operations.

In the drawings, I have shown for purposes of illustration only a preferred embodiment, which will be hereinafter called embodiment "A", and an important modification thereof hereinafter referred to as embodiment "B".

In the drawings,—

Figure 1 is an elevational view partly in section and partly broken away, showing embodiment A;

Figure 2 is a diagrammatic plan view of the foundation for the apparatus shown in Figure 1;

Figure 3 is a section taken along the line III—III of Figure 1;

Figure 4 is a partial elevational view showing arrangement of the switches at the top of the hoist platform guides;

Figure 5 is a section taken along the line V—V of Figure 4;

Figure 6 is a partial elevational view showing a portion of the conveyor and a rack being transported thereby, the position of the rack when supported by the platform when in its uppermost position being shown in dotted lines;

Figure 7 is a section taken along the line VII—VII of Figure 6;

Figure 8 is a section taken along the line VIII—VIII of Figure 1;

Figure 9 is a wiring diagram of the conveyor and hoist circuits;

Figure 10 is an elevational view partly in section of embodiment B;

Figure 11 is a section taken along the line XI—XI of Figure 10;

Figure 12 is a wiring diagram of the control circuit for embodiment B; and

Figure 13 is a wiring diagram of the motor circuit for embodiment B.

General description of embodiment A

In the operation of the embodiment of my invention shown in Figures 1 to 9, inclusive, a rack having a plurality of glass sheets thereon is transported by means of a lift truck, or any other desirable means, to the platform of the washing tank, which platform is normally retained at floor level. The operator bringing the rack to the washing tank lowers the truck, depositing the rack on the platform, and removes the truck therefrom. After removing the truck, leaving the rack with the glass sheets thereon on the platform of the hoist, he pushes a start button which starts the lift motor operating. The motor operates in the proper direction to lower the platform with the rack thereon into the washing tank.

The platform with the rack thereon dwells in the washing tank for any desired predetermined period of time. A sixty second dwell in the washing tank has been found satisfactory. The period of this dwell is determined by relays, the operation of which is hereinafter more fully described.

After the expiration of the period during which the rack and the platform remain in the washing tank, the platform with the rack thereon is raised by the hoist motor to a position above floor level or normal position of the platform. When the platform reaches this position, a switch is operated which stops the hoist motor. When the platform reaches this position it also operates a switch which actuates the conveyor motor and starts the conveyor in operation. The conveyor has a plurality of sets of carrier arms located thereon at spaced intervals. When the conveyor is started up, a set of carrier arms is moved to a position approximately on the center line of the hoist. At this point one of the arms operates a switch which breaks the conveyor circuit, stopping the conveyor. In moving into position on the center line of the hoist, the carrier arms pass under angle irons fastened to the upper portion of the rack.

When the carrier arms reach this position approximately on the center line of the hoist, they operate a switch which closes the circuit to the hoist motor and starts it to again operate, but in the reverse direction, whereby the hoist platform is lowered. The rack is thereby deposited on the carrier arms. When the platform reaches floor level it is automatically stopped and remains there until the hoist motor is actuated again for lowering the platform into the washing tank.

When the platform reaches the floor level, a switch is automatically operated and the conveyor motor is again actuated and the rack is carried by the conveyor to the drying room, which is located adjacent the hoist and the washing tank. When the rack reaches the drying room, a switch is operated which breaks the circuit to the conveyor motor, stopping the conveyor.

The preceding rack which was in the drying room during the time that the particular rack is passing thorugh the operations above described, is carried from the drying room to a discharge position outside the drying room and adjacent one end of the conveyor.

A lift truck is then run under the rack located at the discharge position and the rack raised free of the carrier arms and carried by the truck to a position free of the conveyor. The circuit and switches are so arranged that the rack located at the discharge position must be removed from the conveyor carrier arms before a new circuit can be re-established for the purpose of lowering the hoist into the washing tank.

As may be readily seen, by means of the apparatus just described in general, the passage of the racks carrying the sheets of glass through the washing and drying operations is automatic and there is no manual handling of the glass sheets.

*Specific description of embodiment A*

I will now proceed to more specifically describe the apparatus shown in Figures 1 to 9, inclusive. A washing tank 2, which is rectangularly shaped, is located in a pit 3 which is located below the floor level. The top of the tank 2 is located at approximately floor level on the side at which the glass sheets to be washed are delivered. A hoist, indicated generally by the reference character 4, is located over the tank. Adjacent the hoist and the tank there is located a drying room 5 to which the glass sheets are delivered after they have been immersed in and removed from the bath in the washing tank. Means is provided for delivering heated air to the drying room for drying the glass sheets. This heating means forms no part of the present invention and is not shown in the drawings.

The hoist apparatus and the supporting structure therefor are mounted on beams 10 which are bolted to the floor as at 11. The supporting structure for the hoist comprises a plurality of vertically extending beams or angles 12, the lower ends of which are mounted on and fastened to the horizontally extending beams 10. The upper ends of the beams 12 are joined together by means of a plurality of horizontally extending beams or channels 13. A plurality of beams or channels 14 are provided intermediate the ends of the vertically extending beams or channels 12 for the purpose of bracing the supporting structure. Braces 15 and 16 are also provided for further bracing the supporting structure.

A horizontally extending shaft 20 is mounted in bearings 21 supported on brackets 22 which are attached to the horizontally extending beams or channels 13 at the top of the supporting structure. Drum wheels 23 are mounted on and keyed to the shaft 20. Each drum 23 has one end of a wire cable 24 attached thereto. The lower end of each of the cables 24 is passed through a ring 25 carried by a plate 26 mounted on uprights 27 of the hoist platform 28. The end of each cable 24 which is passed through a ring 25 is fastened to an adjacent portion of the cable 24 as at 24ª.

The hoist platform 28 is made up of a plurality of planks 29 arranged to support a glass supporting rack 30 and to provide tracks for the wheels 31 of a lift truck 32 so that the glass supporting rack may be run on the platform by means of the truck and deposited.

The uprights 27, by which the platform 28 is supported, are attached to the platform at their lower ends. Recesses 33 are provided in the uprights 27, which recesses cooperate with guides 34 on each side of the tank. The guides 34 extend above the tank and are mounted at their upper ends on a bracket 35 supported by the horizontal beams or channels 14. The guides 34 extend down into the washing tank and are fastened to the sides thereof.

The shaft 20 is rotated by means of a sprocket wheel 41 which is mounted on and keyed thereto. The sprocket wheel 41 is driven by a chain 42 which passes over a sprocket wheel 43 which is driven by a motor 44 through the speed reducer 45.

When the shaft 20 is rotated in one direction, the cables 24 are unwound from the drums 23 and the platform 28, to which the cables are attached, is lowered into the washing tank. When the shaft 20 is rotated in the reverse direction, the cables 24 are wound on the drums 23 and the platform raised from the washing tank.

The switches and other apparatus for automatically actuating and stopping the hoist motor for raising and lowering the hoist platform, and their location, will be described hereinafter in connection with the description of the operation of the apparatus.

A conveyor, indicated generally by the reference character 50, is provided for transporting the racks 30 with the glass sheets thereon from the hoist platform through the drying room to a point of delivery. A supporting structure 51 is provided adjacent the point of delivery for supporting one end of the conveyor and for supporting the driving means for the conveyor. The other end of the conveyor 50 is supported by means of the hoist supporting structure.

At one end of the conveyor there is provided a shaft 52 mounted in bearings 53 carried by the supporting structure 51. The shaft 52 has mounted thereon and keyed thereto a large sprocket wheel 54 through which the shaft 52 is driven by means of a chain 55 which passes around the sprocket wheel 54 and around the sprocket wheel 56 which is driven by a motor 57 through a speed reducer 58. The shaft 52 also has mounted thereon and keyed thereto a small sprocket wheel 59 around which the conveyor chain 60 passes and by which the conveyor is driven.

At the other end of the conveyor there is provided a shaft 61 journaled in bearings 62 carried by horizontally extending beams or channels 63 which are mounted on the supporting structure for the hoist. A sprocket wheel 64, around which the continuous chain 60 passes, is mounted on and keyed to the shaft 61. The shafts 52 and 61 have mounted thereon face wheels 49 around which the carrier wheels pass at each end of the conveyor.

The conveyor chain 60 has mounted thereon a plurality of carriers 65 and 66. The carriers 65 and 66 are rigidly attached as at 67 to the conveyor chain 60. Each carrier 66 has mounted on the body 67 thereof a plurality of shafts 68, on each end of which there is mounted a flanged wheel 69. The flanged wheels 69 are adapted to travel on rails 70 when the carrier arms 71 are in position to engage and carry a glass supporting rack 30. The glass supporting rack is adapted to be carried by the carrier arms 71 by means of brackets 72 located on the lower ends of the carrier arms, which brackets are adapted to pass under and engage brackets 73 which are carried by the rack. One of the carrier arms 71 on each carrier 67 is provided with a plate 74 which is adapted to operate the hatchway limit switches hereinafter described. Each carrier 67 also has pivotally mounted thereon an arm 75. The arm 75 has attached thereto an arm 76 which is adapted to engage the brackets 73 when the carrier arms 71 are carrying a glass supporting rack. When the arm 76 is in contact with the rack, the arm 75 is raised to a position to engage and operate hatchway limit switches hereinafter described.

Each carrier 65 is similar to the carriers 66 except that it does not have attached thereto the apparatus for engaging the hatchway limit switches. The carrier arms 77 of the carriers 65 are longer than the carrier arms 71 of the carriers 66 due to the fact that the conveyor is inclined to the horizontal.

Carriers 65 and 66 are mounted in pairs so that a carrier 65 and a carrier 66 is adapted to simultaneously engage and transport a single glass supporting rack.

The main motor circuit of the hoist motor is handled by four directional switches 1—H, 2—H, 1—L and 2—L, and one accelerating relay and switch AR—1. The directional contact switches are mechanically interlocked so that both the hoist switches 1—H and 2—H and the lower switches 1—L and 2—L cannot be closed at the same time. Closing the hoist switches 1—H and 2—H will connect the motor 44 to the line in the hoist direction, and closing the lower switches 1—L and 2—L connects the hoist motor 44 to the line for driving it in the opposite direction for lowering the platform. The series field of the motor is designed for intermittent duty and is connected into the circuit only during starting in order to give commutation. The accelerating switch AR—1 is furnished with an oil dash-pot so that there is a definite time delay of approximately four seconds before the last contact of the accelerating switch AR—1 closes. This gradually accelerates the motor, cutting out successive steps of resistors until the motor is finally directly across the line and the series field is short-circuited.

The shunt field of the hoist motor is designed for intermittent duty. Consequently, the protecting resistor DF is inserted in series with the field to protect it when the motor is not running. This resistor is short-circuited by the contact of the brake relay BR when the motor is running and when the motor stops, this relay opens, inserting the protecting resistor in the circuit. The other contact of the brake relay BR energizes the shunt brake. This brake is a magnetically-released spring-set brake and as soon as brake relay BR drops out, the shunt brake coil is opened and the brake sets, whereby the motor is stopped.

The conveyor motor is of the non-reverse type and the armature of this motor is connected directly to the line by the switch AR—2, which normally serves to connect the motor to the line but also acts as an accelerating switch which cuts out steps of the armature resistor and accelerates the motor smoothly to full speed. The series field of this motor is also short-circuited after the motor is up to speed.

When operations are started, the hoist platform, as stated above, is at the floor level. The operator transports a rack 30 with the glass sheets thereon to be washed to the platform 28. The lift truck is lowered and the rack deposited on the platform and the lift truck removed from the platform. At this time the operator establishes a circuit from the motor to the control panel. The operator then pushes the lower or start push button 90 which closes the relay CR—1, which maintains through its one normally open contact which by-passes the lower push button 90 after the relay is once closed. The relay CR—1 also completes the circuit to switches 1—L and 2—L which connect the hoist motor to the line. The electrical interlocks of the switches 1—L and 2—L close the brake relay BR, releasing the shunt brake SB and giving full field on the motor and also on the accelerating switch AR—1, thereby accelerating the motor to full speed.

The platform lowers until it reaches the bottom of its travel where hatchway limit switch 100 is tripped. The hatchway limit switch 100 is located on the hoist structure adjacent the bottom thereof. The hatchway limit switch 100 is operated by a plate 101 which is attached to the adjacent upright 27. The switch 100 is of the ordinary double contact type of limit switch. One contact of the switch 100 is normally open and one contact normally closed. When the limit switch 100 is tripped by the plate 101, this opens the circuit to the switches 1—L and 2—L, disconnecting the motor from the line. At this time the interlocks on the lower switches open, dropping out both the brake relay BR and the accelerating switch AR—1. When the brake relay BR opens, the brake sets. At this same time the shunt field of the hoist motor is weakened by a protecting resistor DF.

As stated above, the switch 100 has double contacts. The normally opened contact of the switch 100, which is operated when the platform reaches the lowermost position, closes, completing the circuit to the timing relay TR magnet and motor. The timing relay motor and magnet are indicated on the wiring diagram by the reference characters TR with the word "motor" or "magnet", as the case may be, thereafter.

A definite period of time after this circuit has been established, say sixty seconds, the normally closed contact of the timing relay TR opens, thereby breaking the circuit to the timing relay motor. The normally open contact of the timing relay then closes, thereby completing the circuit to the hoist switches 1—H and 2—H. This connects the motor across the line in the hoist direction. The interlocks in the hoist switch maintain the contactors closed and also pick up the relay BR, releasing the brake and giving full field to the motor. The accelerating relay AR—1 accelerates the motor to full speed. This carries the hoist upwardly.

The platform of the hoist is at this time carried to a point above the floor level. When the hoist comes within a few inches of the top of its travel, limit switches 102 and 103, which are located side by side on the supporting structure for the hoist, are tripped by the plates 101 carried by the uprights of the hoist. The limit switches 102 and 103 are similar to the switch 100 which is adapted to stop the hoist at its lowermost position. Both contacts of the limit switch 102 are normally closed. These contacts are both opened when the switch comes in contact with the plate 101. The opening of the limit switch 102 has no effect, since the switches 1—L and 2—L are already open. Limit switch 103 normally has both contacts open. When this switch is closed by the raising of the platform, it places in the circuit accelerating relay switch AR—2 which is adapted to start the conveyor motor 57 in operation. A circuit is established across the line by the closing of both contacts of the switch 103 and, as stated above, the conveyor is started up. The switch 103 is a momentary contact switch, but a circuit is maintained around the switch 103 through an interlock which by-passes it after it has once been closed.

After operating the momentary contact switch 103 and opening the circuit through switch 102, the hoist continues to travel in an upwardly direction. When the hoist reaches the top of its travel, hatchway limit switches 104 and 105 are operated by the plates 101. The switch 104 has one contact normally closed and one contact normally open. The switch 105 normally has both contacts closed. When the switch 104 is operated, the normally open contact is closed, which partially establishes a circuit to switch 1—L. When the normally closed contact of switch 104 is opened, the circuit to the conveyor switch AR—2 is partially open.

The operation of switch 105, which is normally closed, opens the circuit through 1—H and 2—H, disconnecting the hoist motor 44 from the line. The hoist interlock opens, breaking the circuit to BR and AR—1, thereby dropping out the accelerating switch. Opening the brake relay sets the shunt brake and weakens the motor field.

A hatchway limit switch 106 is so located as to be engaged by the plate 74 on the carrier arm 71 of the carrier 67 as the carrier arms come into position on the center line of the platform. This switch has one contact normally open and one contact normally closed. When the switch is operated, the opening of the closed contact serves to stop the conveyor motor as it opens the circuit to AR—2, the contact of switch 104, which is also in the conveyor circuit, having been previously opened by the hoist upon reaching its uppermost position.

The normally open contact of the limit switch 106 is closed at this time. The normally open contact of switch 104 having been previously closed, a circuit is established to the lower switches 1—L and 2—L, which connects the hoist motor to the line, closing relays BR and AR—1 through the lower interlocks. The establishment of this circuit causes the platform to be lowered to floor level, the lowering of the platform to this point being sufficient to allow the rack to be suspended on the conveyor arms. The platform is stopped at floor level by virtue of the opening of limit switch 102, the opening of which breaks the circuit to the lower switches 1—L and 2—L, disconnecting the motor from the line. The brake relay and accelerating relay AR—1 are dropped out at this point also, setting the shunt brake on the hoist motor and weakening the motor field. The platform is then in position ready to receive the next rack and repeat the cycle.

When the hoist is lowered to the floor position, momentary contact switch 103 is closed and AR—2 picked up, which starts the conveyor motor which continues to run until the plate 74 on conveyor arm 71 trips limit switch 107, which is located at the discharge point. This limit switch 107 has both contacts normally closed. It is a momentary contact switch and immediately re-closes. The tripping of this switch, however, stops the conveyor motor.

Limit switches 108 and 109, (not shown except in Figure 9), and 110 are emergency limit switches and do not operate during the normal operation of the conveyor and lift. The switch 110 is located adjacent the discharge position and opens the conveyor circuit when the arm 75 comes in contact therewith and prevents the conveyor from operating until after the rack is removed from the conveyor at the discharge point. The hatchway limit switches 108 and 109 are located so as to be operated by the conveyor arms when they are over the hoist platform. These switches are normally closed but are set to stop the operation of the conveyor motor if the rack does not properly line up with the conveyor carrier arms.

The rack which has been dipped and passed to the drying room by virtue of the operations above described remains in the drying room until after the immediately preceding rack is removed from the adjacent set of carrier arms and until the operator again pushes the start button.

*General description of embodiment B*

In Figures 10 to 13, inclusive, I have shown a modified form of my invention. This modified form is in many respects similar to the form shown in Figures 1 to 9, inclusive. In this embodiment there is provided a washing tank located in a pit in the floor, a hoist similar to the hoist described above, a drying room in which the glass sheets are dried, and a conveyor. In this embodiment the conveyor is horizontal instead of inclined, as in the first described embodiment, and extends on both sides of the tank and hoist.

In this embodiment the glass supporting rack is not transported by means of a lift truck to the hoist platform. The rack having the sheets thereon to be washed is transported up to the one end of the conveyor and the truck lowered and the rack deposited on the carrier arms of the conveyor. The truck is then removed and the conveyor actuated. The conveyor transports the rack to a position over the washing tank. At this point the conveyor is automatically stopped.

The hoist mechanism is then automatically actuated and the platform thereof raised above the floor level lifting the rack free of the carrier arms of the conveyor. The conveyor is then reversed and the carrier arms used for transporting the rack to the washing tank freed from the rack. The hoist mechanism is then again automatically actuated and the platform thereof, with the glass supporting rack thereon, lowered into the washing tank. After a predetermined dwell therein, the hoist mechanism is again actuated and the platform, with the rack thereon, raised from the washing tank to the position above floor level. At this time the conveyor is again automatically actuated and one set of the carrier arms carried thereby moved to the center line of the hoist under the carrier arm-engaging angles on the rack. The hoist mechanism is again then automatically actuated and the hoist platform lowered to floor level, leaving the rack hanging on the carrier arms.

After the hoist platform reaches floor level, another rack is placed on the carrier arms of the conveyor located at the loading point. The conveyor is again actuated by virtue of the operator pushing the start button and the new rack transported to a position over the tank. The rack immediately preceding, by virtue of the operation of the conveyor, is transported from its position over the washing tank to a position in the drying room, which is located adjacent the hoist. The cycle of operation above described is then again repeated.

After the second rack has been washed and is suspended on the carrier arms ready for transportation to the drying room, a third rack is placed on the set of carrier arms at the loading point and the conveyor mechanism again actuated. The rack which was in the drying room is then transported to the unloading point adjacent one end of the conveyor. When a rack is on the conveyor at the unloading end thereof, no new rack can be washed until the rack at the unloading point is removed from the conveyor. This is due to the fact that certain hatchway limit switches, hereinafter more fully described, are provided and so arranged that the conveyor motor will not be actuated until after the rack located at the loading point is removed from the carrier arms.

*Specific description of embodiment B*

I will now proceed to more specifically describe the modified form of my invention shown in Figs. 10 to 13, inclusive.

In this embodiment there is shown a washing tank 115 located in a pit 116 which is below the floor level.

Located immediately above the washing tank 115 is a hoist 117 which is similar to the hoist above described and as shown in Figures 1 to 9, inclusive. The hoist is provided with a platform 118 which is adapted to be raised or lowered by the rotation of the shaft 119. The shaft 119 has drums 120 thereon, around which cables 121 pass. The one end of each of the cables 121 are attached to uprights 122 connected to the platform. The shaft 119 is rotated by a motor which is adapted to drive a sprocket wheel 123, which in turn drives a sprocket wheel 124 by means of the chain 125.

The drying room 126 is located on one side of the hoist. The racks with the glass sheets thereon are transported from a position above the washing tank directly into the drying room. Apparatus (not shown) is provided for supplying heated air to the drying room for drying the glass sheets. The conveyor, indicated generally by the reference character 127, is substantially the same as the conveyor shown in Figures 1 to 9, inclusive, and hereinbefore described, except that it is horizontal. The conveyor 127 further differs from that shown in Figures 1 to 9 in that it has an extension 128 thereon which extends out beyond the washing tank to a loading point. The conveyor 127, which carries a plurality of sets of carriers 129 adapted to engage and transport the glass supporting racks, is driven by means of a motor 130 through a chain 131 which passes over a sprocket wheel 132 carried by the motor shaft and over sprocket wheel 133 on the conveyor shaft.

The conveyor motor 130 is furnished with a continuous duty shunt field which is connected to the line permanently, and a continuous duty series field which is energized when the motor is running. The armature circuit of the conveyor motor is handled by four direction switches, 1—F′, 2—F′, 1—R′ and 2—R′. The forward switches 1—F′ and 2—F′, and the reverse switches 1—R′ and 2—R′ are mechanically interlocked so that only two can be closed at a time. The accelerating relay and switch AR—1′ is set for approximately four seconds. It is energized at the same time that the forward or reverse switches are closed and accelerates the conveyor motor up to full speed approximately four seconds after the switches are closed.

The armature circuit of the hoist motor is handled by four direction switches 1—H′ and 2—H′ for raising the hoist, and 1—L′ and 2—L′ for lowering the hoist, and the accelerating relay and switch AR—2′ which is set for approximately four seconds. The series field of the hoist motor is designed for intermittent duty and is in circuit only during starting in order to provide proper commutation. The shunt field of the hoist motor is also designed for intermittent duty. The full voltage is applied to this field only when the brake relay BR′ is closed. When this brake relay BR′ is open and the motor is not running, the protecting resistor MN′ is inserted in series with the shunt field. The shunt brake used on the hoist motor is mechanically-released and spring-set. The normally open contact of the brake relay BR′ serves to release the brake when the motor starts and to set the brake when the motor is disconnected from the line.

Latched-in relays LS—1′ and LS—2′, and timing relays TR—1′ and TR—2′ are provided. The latched-in relays are furnished with two normally open contacts and one normally closed contact. They are also furnished with a closing coil and a tripping coil. These are instantaneous duty coils and in closing the relays it is merely necessary to energize the closing coils and the relays latch in the closed position. They will remain in this position until the trip coils are energized, releasing the latches.

The timing relays TR—1′ and TR—2′ are each furnished with a motor and magnet. The motor and magnet are energized at the same time. These relays each have three contacts. One of the contacts of each relay is normally closed and is adapted to open after the expiration of a definite period of time. One of the other contacts is normally open and closes after a definite period of time. One of the contacts closes as soon as the magnet picks up, providing a maintaining circuit for the magnet if this is required. The setting of the relay is determined by the number of revolutions which the motor makes.

In describing the complete cycle of operation of this embodiment, we will assume that the platform 118 of the hoist is at floor level, which is normal position, and that a glass supporting rack 134 has been placed on the set of conveyor arms at the loading point, indicated generally by the reference character 135.

The operator depresses the start button 136, which closes the forward switches 1—F′ and 2—F′, connecting the conveyor motor 130 to the line. These forward switches maintain through the forward interlocks, designated at 1—F′ Int. on the drawing. These interlocks also pick up the accelerating switch AR—1′, which accelerates the motor to full speed. They also pick up the relay CR—1′. The operation of this relay CR—1′ does nothing at this time, in view of the fact that the timing relay motor and magnet TR—1′ have not yet been energized.

The conveyor motor 130 is started in this fashion and runs in the forward direction until the rack is directly over the platform of the washing tank. At this point, limit switch 140 is operated. This switch 140 normally has one contact thereof open and one contact closed. It is a momentary contact switch and is operated by the plates carried by the carrier arms. The opening of the normally closed contact of switch 140 stops the conveyor directly over the center line of the platform. This drops out the forward switches 1—F' and 2—F', disconnecting the conveyor motor 130 from the line and dropping out switches AR1' and CR1'.

The normally open contact of limit switch 140 is closed at the same time that the normally closed contact is opened. This makes a circuit through the normally open contact of the latched-in relay LS—2', which at this point is closed to the hoist switches 1—H' and 2—H'. The hoist switches 1—H' and 2—H' then close, connecting the hoist motor to the line. These switches maintain through the hoist interlocks, which also pick up the brake relay BR', giving full field on the motor and releasing the shunt brake and accelerating switch AR—2', which accelerates the hoist motor to full speed.

The hoist motor then raises the platform 134 to the top of its travel, at which point it trips limit switches 141 and 142. Both contacts of the limit switch 141 are normally open and both contacts of the limit switch 142 are normally closed. Tripping out limit switch 142 opens the circuit to the hoist switches and disconnects the hoist motor from the line. The hoist interlocks open, dropping out the brake relay BR', weakening the motor field and setting the brake. Accelerating switch AR—2' is also dropped out.

Limit switch 141 is a momentary contact switch and when this closes it completes a circuit through the normally open contact LS—1' of the latched-in relay which is closed at this time, completing the circuit to the reversing switches 1—R' and 2—R'. These reversing contactors close, connecting the conveyor motor to the line. The switches maintain through the 1—R' interlock, which also closes accelerating switch AR—1', accelerating the motor to full speed. Relay CR—1' also closes at this time but the operation of this relay has no further effect in view of the fact that the timing relay TR—1' has not been energized. This establishes a circuit which will carry the conveyor in the reverse direction until the conveyor arms are clear of the track. A comparatively short travel of the conveyor arms will suffice to carry it clear of the rack, which at this time rests on the platform 134.

When the conveyor arms are clear of the rack, one of the sets of conveyor arms engages the limit switch 143 and trips it, opening its contact and breaking the circuit to the reversing switches. This disconnects the motor from the line and drops out the accelerating switch AR—1' and control relay CR—1'. This causes the conveyor to stop at this position.

At the same time that the switch 143 is operated, a switch 144 is operated by the conveyor carrier arms so as to start the hoist motor in a direction to lower the platform 134, with the rack thereon, into the washing tank. The switch 144 is a momentary contact switch operated by the hinged plate carried by the carrier arms. The switch 144 is normally open and when it closes it completes the circuit to the control relay CR'. This relay maintains itself through one of its own contacts which by-passes the lower push button and the switch 144.

The other contact of the control relay CR' completes the circuit to the lower switches 1—L' and 2—L'. This connects the hoist motor to the line and also closes the lower interlock fingers, which picks up the brake relay, giving full field on the motor and releasing the brake. It also picks up the accelerating switch AR—2' which accelerates the hoist motor to full speed. This serves to lower the platform to the lowermost position in the washing tank.

When the platform 134 reaches the lowermost position in the washing tank, a limit switch 145 is tripped. The limit switch 145 has one contact normally open and one contact normally closed. The opening of the normally closed contact drops out the control relay CR' and also the lower switches 1—L' and 2—L'. With the lower switches 1—L' and 2—L' out, the hoist motor is disconnected from the line and the accelerating switch AR—2' opened and the brake relay BR' also opened. The brake is set then and the motor field weakened. The hoist is consequently stopped at the bottom of the travel.

The normally open contact of limit switch 145 closes at the same time that the normally closed contact of the switch opens. This completes a circuit to the trip coils LS—1—T and LS—2—T on the latched-in relays LS—1' and LS—2', tripping the latch, which opens the normally open contact of the switch and closes the normally closed contact. The closing of the normally open contact of the limit switch 145 also completes the circuit to the timing relay magnet and motor TR—2'.

After a definite period of time, which is determined by the setting of the timing relay TR—2', the normally open contact on this timing relay TR—2' closes, completing the circuit to the hoist switches 1—H' and 2—H'. This closes the hoist switches which maintain through the hoist interlock, which also closes the circuit to the brake relay, giving full field on the motor and releasing the brake and the accelerating switch AR—2' whereby the motor is accelerated up to full speed.

The hoist is then raised to the top of its travel, at which point limit switches 141 and 142 are again tripped. When limit switch 142 is tripped, the circuit to the hoist switches 1—H' and 2—H' is interrupted, disconnecting the hoist motor from the line and opening the hoist interlock. The accelerating switch AR—2' is dropped out and the brake relay BR' opened whereby the motor field is weakened and the shunt brake released. The platform is thereby stopped at the top of its travel.

At the same time that the normally closed contacts of switch 142 are opened, the normally open contacts of switch 141 are closed momentarily. This makes a circuit through the normally closed contacts LS—1' to the timing relay TR—1' magnet and motor. The switch 141 being a momentary contact switch, the relay TR—1' must be retained closed in order to cause the conveyor motor to operate. This is accomplished by using as a maintaining contact the normally open contact TR—1—A, which closes as soon as the relay TR—1' closes. After a definite period of time after the timing relay TR—1' is energized, it closes contact TR—1—B, completing the circuit from TR—1—A through TR—1—B through limit switch 140 to the forward switches 1—F' and 2—F'. This connects the conveyor motor 130 to the line, closing the 1—F' interlock which maintains the forward switches closed. When the 1—F' interlock closes, the accelerating switch AR—1' also closes, accelerating the motor to full speed. Control relay CR—1' also operates, opening its normally closed contact and breaking the circuit to the timing relay TR—1' motor and magnet.

The conveyor then travels in the forward direction until it again trips limit switch 140. When the normally closed contact of limit switch 140 is opened, the forward switches drop out, disconnecting the conveyor motor from the line and the accelerating switch AR—1' is opened. This does not occur until the conveyor arms are directly over the center of the platform and in a position to engage the rack when the platform with the rack thereon is lowered.

The limit switch 140, as stated above, has one contact which is normally open and one contact which is normally closed. When the carrier arms reach the center line, the switch 140 is operated, as stated above, and the normally open contact is closed. This completes the circuit through the normally closed contact of limit switch 146 to the lower switches 1—L' and 2—L'. This completes the circuit to the hoist motor so that the hoist motor will again operate in a direction to lower the platform. The contactors are maintained closed through the interlocks, which also pick up the brake relay BR', releasing the brake and giving full field on the motor and the accelerating switch AR—2', accelerating the motor to full speed.

When the platform reaches floor level, limit switch 146 will be engaged. Both contacts of this limit switch 146 are normally closed. When the switch is operated by the hoist upon its reaching floor level, both contacts are opened, breaking the hoist circuit to the lower switches 1—L' and 2—L', disconnecting the hoist motor from the line. The brake relay BR' drops out, the brake is set and the motor field weakened. The accelerating switch AR—2' opens and the platform is stopped at floor level.

At the same time that the limit switch 146 is tripped out, limit switch 147, which normally has both contacts open, is operated. These contacts are closed and the circuit completed to the closing coils of the latched-in relays. These relays LS—1' and LS—2' close and latch in the same position that they were in when the operator started the above cycle of operation. At this time, the glass on the rack has been washed and the rack is suspended on the conveyor over the platform.

The operator will now place a new rack on the conveyor arms at the loading point and the cycle of operation just described will again be repeated. Limit switches 148, 149, 150 and 151 are over-travel emergency switches and do not operate during the normal cycle of operation. Switches 148 and 149 are located at the delivery end of the conveyor and are engaged by the rack during its passage. These switches interrupt the current through the conveyor circuit and prevent operation of the conveyor until the rack adjacent the discharge end of the conveyor has been removed therefrom. The conveyor stops at switch 148 for unloading. When the rack is being removed, switch 149 is engaged and continues to keep the circuit dead until the rack is absolutely clear of the conveyor supports.

The limit switches 150 and 151 are normally closed. They are adapted to stop the elevator motor if the rack is not properly aligned with the conveyor carrier arms.

As may be readily seen, either one of the above described embodiments of my invention can be effectually used to obtain economical handling of glass sheets during the washing and drying operations.

While I have shown and described a preferred embodiment and one modification of my invention, it is to be understood that I do not intend to be limited thereby but that the invention may be otherwise embodied within the scope of the appended claims.

I claim:

1. Apparatus for washing sheet glass comprising a tank, a platform normally at substantially floor level above the tank, means for lowering the platform into the tank and for automatically raising the same therefrom after a predetermined dwell therein to a position above the first mentioned position and for automatically lowering the platform to the normal position after a predetermined dwell at the uppermost position.

2. Apparatus for washing sheet glass comprising a tank, a platform normally disposed adjacent the top of the tank, means for lowering the platform into the tank and for automatically raising the platform to a position above the first mentioned position after a predetermined dwell in the tank, a conveyor having a plurality of arms thereon, driving means for the conveyor, means for automatically actuating the conveyor driving means as the platform is raised to said uppermost position, means for stopping the conveyor when an arm thereof is positioned above the platform, means operated by the conveyor for actuating the platform hoisting mechanism for lowering the platform to its initial position, and means for again automatically actuating the conveyor driving means.

3. Apparatus for washing sheet glass comprising a tank, a hoist having a material supporting platform normally disposed adjacent the top of said tank, driving means for the hoist, means for actuating the hoist driving means for lowering the platform into the tank, means for automatically actuating the hoist driving means for raising the platform to a position above normal position after a predetermined dwell in the tank, a conveyor having a plurality of arms thereon, means for driving the conveyor, means for actuating the conveyor driving means as the platform travels to its last mentioned position, means for automatically stopping the conveyor when an arm thereof is in position above the hoist platform, means for again automatically actuating the hoist driving means for lowering the platform to its normal position, and means for automatically reactuating the conveyor driving means.

4. Apparatus for washing sheet glass comprising a tank, a hoist having a material supporting platform normally disposed adjacent the top of said tank, driving means for the hoist, means for actuating the hoist driving means for lowering the platform into the tank, means for automatically actuating the hoist driving means for raising the platform to a position above normal position after a predetermined dwell in the tank, a conveyor having a plurality of arms thereon, means for driving the conveyor, means actuated by the hoist in the travel of the platform to its last mentioned position for actuating the conveyor, means for automatically stopping the conveyor when an arm thereof is in position above the hoist platform, means for automatically actuating the hoist driving means for then lowering the platform to its normal position, and means for automatically reactuating the conveyor driving means.

5. Apparatus for washing sheet glass comprising a tank, a hoist having a material supporting platform normally disposed adjacent the top of said tank, driving means for the hoist, means for actuating the hoist driving means for lowering the platform into the tank, means for automatically actuating the hoist driving means for raising the platform to a position above normal position after a predetermined dwell in the tank, a conveyor having a plurality of arms thereon, means for driving the conveyor, means actuated by the hoist in the travel of the platform thereof to its last mentioned position for actuating the conveyor driving means, means for automatically stopping the conveyor when an arm thereof is in position above the hoist platform, means operated by the conveyor for actuating the hoist driving means for lowering the platform to its normal position, and means for automatically reactuating the conveyor driving means.

6. Apparatus for washing sheet glass comprising a tank, a hoist having a material supporting platform normally disposed adjacent the top of said tank, driving means for the hoist, means for actuating the hoist driving means for lowering the platform into the tank, means for automatically actuating the hoist driving means for raising the platform to a position above normal position after a predetermined dwell in the tank, a conveyor having a plurality of arms thereon, means for driving the conveyor, means actuated by the conveyor in the travel of the platform thereof to its last mentioned position for actuating the conveyor driving means, means for automatically stopping the conveyor when an arm thereof is in position above the hoist platform, means operated by the conveyor for actuating the hoist driving means for lowering the platform to its normal position, means for automatically reactuating the conveyor driving means, a drying room adjacent the tank, and means for automatically stopping the conveyor when the above mentioned arm is in position in the drying room.

7. Apparatus for washing sheet glass comprising a tank, a rack adapted to support a plurality of glass sheets, a hoist having a supporting platform normally disposed adjacent the top of said tank adapted to support the glass supporting rack, means for lowering the platform and the rack thereon into the tank and for automatically raising the platform and the rack thereon to a point above the normal position after a predetermined dwell in said tank, and a conveyor system adapted to engage the rack and transport it to a point of delivery.

8. Apparatus for washing sheet glass comprising a tank, a rack adapted to support a plurality of glass sheets, a hoist having a supporting platform normally disposed adjacent the top of said tank adapted to support the glass supporting rack, means for lowering the platform and the rack thereon into the tank and for automatically raising the platform and the rack therefrom to a point above the normal position after a predetermined dwell in the tank, and an automatically actuated conveyor system adapted to engage the rack and transport it to a point of delivery.

9. Apparatus for washing sheet glass comprising a tank, a rack adapted to support a plurality of glass sheets, a hoist having a supporting platform normally disposed adjacent the top of said tank adapted to support the glass supporting rack, means for lowering the platform and the rack thereon into the tank and for automatically raising the platform and the rack thereon therefrom to a point above the normal position after a predetermined dwell in said tank, a conveyor having a plurality of sets of rack engaging arms thereon, driving means for the conveyor, means for automatically actuating the conveyor driving means as the hoist platform moves to its position above normal position, means for automatically stopping the conveyor as a set of rack engaging arms are positioned so as to engage the rack, means for automatically actuating the hoist for lowering the platform to normal position and for suspending the rack on the conveyor arms, and means for automatically actuating the conveyor driving means for transporting the rack to a point of delivery.

10. Apparatus for washing sheet glass comprising a tank, a hoist having a platform normally adjacent the top thereof, driving means for the hoist, a conveyor adjacent the hoist and tank having a plurality of carrier arms thereon, driving means for the conveyor, means for actuating the conveyor driving means, means for automatically stopping the conveyor when an arm thereof is positioned over the hoist platform, means for automatically actuating the hoist driving means as the conveyor arm is positioned over the hoist platform for raising the platform to a position above normal position, means for automatically actuating the conveyor driving means for moving the carrier arm to another position adjacent the platform, means for automatically actuating the hoist driving means for lowering the platform to a position in the tank, means for automatically actuating the hoist driving means for raising the platform to a position above normal position after a predetermined dwell in the tank, means for automatically actuating the conveyor driving means for again positioning the conveyor arm over the platform, means for automatically actuating the hoist driving means for lowering the platform to normal position, and means for again automatically actuating the conveyor driving means for moving the conveyor arm to a point clear of the platform.

11. Apparatus for washing sheet glass comprising a rack adapted to support a plurality of glass sheets, a tank, a hoist having a platform normally adjacent the top of said tank, driving means for the hoist, a conveyor adjacent the hoist and the tank having a plurality of sets of carrier arms thereon each adapted to support a glass supporting rack, driving means for the conveyor, means for actuating the conveyor driving means, means for automatically stopping the conveyor when a set of arms thereof having a glass supporting rack thereon is positioned over the hoist platform, means for automatically actuating the hoist driving means as the conveyor arm is positioned over the hoist platform for raising the platform to a position above normal position whereby the rack is lifted free of the set of carrier arms, means for automatically actuating the conveyor driving means for moving the set of carrier arms to a position clear of the glass supporting rack, means for automatically actuating the hoist driving means for lowering the platform with the glass supporting rack thereon to a position in the tank, means for automatically actuating the hoist driving means for raising the platform and the rack thereon to a position above normal position after a predetermined dwell in the tank, means for automatically actuating the conveyor driving means for moving the set of conveyor arms to a position for engaging the rack on the platform, means for automatically actuating the hoist driving means for lowering the platform to normal position whereby the rack is permitted to be supported by the set of conveyor arms, and means for automatically actuating the conveyor driving means for moving the set of conveyor arms and the rack thereon to a point of delivery.

12. Apparatus for washing sheet glass comprising a rack adapted to support a plurality of glass sheets, a tank, a hoist having a platform normally adjacent the top of said tank, driving means for the hoist, a conveyor adjacent the hoist and the tank having a plurality of sets of carrier arms thereon each adapted to support a glass supporting rack, driving means for the conveyor, means for actuating the conveyor driving means, means for automatically stopping the conveyor when a set of arms thereof having a glass supporting rack thereon is positioned over the hoist platform, means for automatically actuating the hoist driving means as the set of conveyor arms is positioned over the hoist platform for raising the platform to a position above normal position whereby the rack is lifted free of the set of carrier arms, means for automatically actuating the conveyor driving means for moving the set of carrier arms to a position clear of the glass supporting rack, means for automatically actuating the hoist driving means for lowering the platform with the glass supporting rack thereon to a position in the tank, means for automatically actuating the hoist driving means for raising the platform and the rack thereon to a position above normal position after a predetermined dwell in the tank, means for automatically actuating the conveyor driving means for moving the set of conveyor arms to a position for engaging the rack on the platform, means for automatically actuating the hoist driving means for lowering the platform to normal position whereby the rack is permitted to be supported by the set of conveyor arms, a drying room, means for automatically actuating the conveyor driving means for moving the set of conveyor arms and the rack thereon to a position in the drying room, and means for actuating the conveyor driving mechanism for moving the conveyor arms and the rack thereon to a point of delivery.

LONNIE J. PIERCE.